Figure 1:
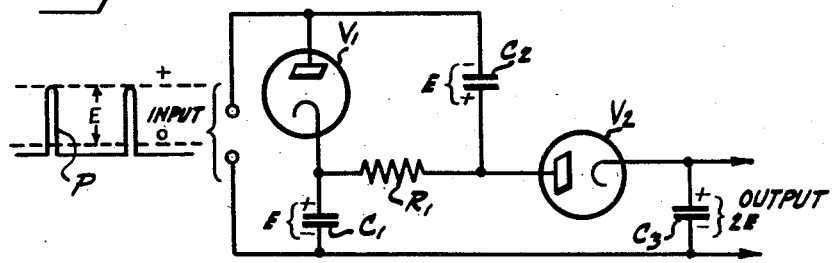

April 6, 1948.  W. R. KOCH  2,439,224
RECTIFIER
Filed Nov. 6, 1945

INVENTOR.
Winfield R. Koch
BY H. S. Srover
ATTORNEY

Patented Apr. 6, 1948

2,439,224

UNITED STATES PATENT OFFICE 2,439,224

RECTIFIER

Winfield R. Koch, Haddonfield, N. J., assignor to Radio Corporation of America, a corporation of Delaware Application November 6, 1945, Serial No. 627,056

3 Claims. (Cl. 171—97)

The present invention relates to high-voltage rectifiers, especially pulse rectifiers of the type which are frequently used in television receiving systems to provide the potentials required by the accelerating electrodes of the image-reproducing cathode ray tube.

In a copending application of Otto H. Schade, Serial No. 578,678, filed February 19, 1945, there is disclosed a rectifier which utilizes the voltage pulses developed across one winding of a coupling or output transformer during the retrace periods of the cathode ray scanning beam thereby to provide a substantially smooth D.-C. (direct current) potential for application to the second anode of the image-reproducing cathode ray tube or kinescope, the amplitude of this substantially smooth D.-C. potential being approximately two or more times the peak amplitude of the voltage pulses.

As pointed out in the mentioned Schade application, conventional voltage step-up, or "multiplying," arrangements are not practical for the purpose of obtaining cathode ray tube accelerating potentials (which may be in the neighborhood of 30,000 volts, for example) from a scanning circuit due to the highly unsymmetrical character of the voltage wave. Consequently, the Schade disclosure comprises a series of rectifier units, each of these units including a condenser or other energy storing device across which there is developed a relatively smooth D.-C. potential having a value approximately equal to the peak value of the input pulses. These energy storage devices are then connected in a particular series relation, so that the output voltage of the rectifier system is approximately the sum of the voltages developed on the energy storage devices of the individual units.

The performance of a rectifier system such as disclosed in the copending Schade application referred to above is satisfactory as long as the load on the rectifier remains relatively constant. Due to the series connection of the energy storage devices, however, any appreciable increase in load may cause a noticeable drop in the amplitude of the output voltage. In other words, for a varying load, it is difficult to obtain a high standard of regulation with a rectifier of this type.

It is an object of the present invention, therefore, to provide a high-voltage surge type rectifier circuit in which the output voltage drop in the face of load fluctuations is at a minimum.

It is a further object of the invention to provide a high-voltage surge type rectifier circuit in which storage condensers having relatively low rated capacity values may be used for a given regulation or output voltage.

Figure 2:
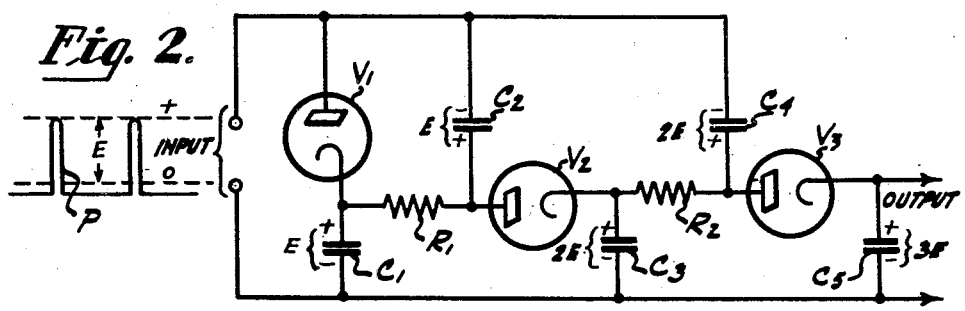
Figure 3:
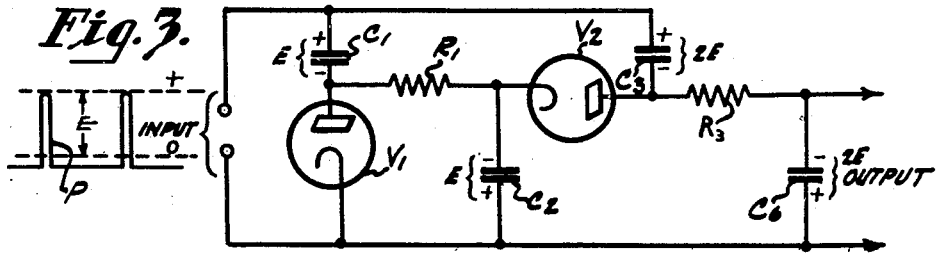

Other objects and advantages will be apparent from the following description of preferred forms of the invention and from the drawings, in which:

Fig. 1 is a circuit diagram of a pulse type rectifier in accordance with the present invention, arranged to provide a voltage output of approximately twice the voltage input;

Fig. 2 is a circuit diagram of a pulse type rectifier in accordance with the present invention, arranged to provide a voltage output approximately three times the voltage input; and Fig. 3 is a circuit diagram of a modification of the circuit of Fig. 1 so as to secure a multiplied output voltage of negative polarity from an input of pulses of positive polarity. These voltages are given with respect to ground, or to the terminals of the input and output which are directly connected together.

Referring first to Fig. 1, there is shown a preferred form of voltage doubling circuit operating in accordance with the present invention. A series of input voltage pulses P of positive polarity are applied across the series combination of a rectifier tube $V_1$ (which may be a diode as shown, or any other suitable unidirectional conducting device) and a condenser (or other suitable energy-storage element) $C_1$. Due to the rectifying action of tube $V_1$, condenser $C_1$ will be charged to the peak voltage E of the input pulses P, the upper plate (in the drawing) of condenser $C_1$ being of positive polarity.

During the time intervals between the pulses P, a portion of the positive charge on condenser $C_1$ will leak off through resistor $R_1$ to a second condenser, or energy-storage element, $C_2$, the latter having one of its plates connected to the anode of tube $V_1$. Consequently, after several cycles of the input wave, the charge on condenser $C_2$ will also be equal to the peak voltage E of the pulses P, the polarity of the charge on condenser $C_2$ being as shown in the drawing.

Condenser $C_2$ is connected across the input terminals of the system in series with a further rectifier tube $V_2$ (shown as a diode) and a further energy-storage element $C_3$ (shown as a condenser). Accordingly, during the pulse periods, tube $V_2$ has applied to it not only the peak pulse voltage E, but also the D.-C. charge E on condenser $C_2$. The polarity of these potentials is such that the condenser $C_3$ will be charged to a peak value 2E, representing the algebraic sum of the peak pulse E and the D.-C. voltage E on condenser $C_2$. The output voltage 2E of the system is derived from across condenser $C_3$.

As previously stated, the rectifying system of the present invention is particularly suited for use in circuit applications where the load fluctuates in value. The output of the disclosed system, in the face of such fluctuations, is much more stable than in the case of rectifying arrangements where the energy-storage elements are connected in series relation. This is readily appreciated when it is considered that, in series arrangements, the energy-storage element between the first two rectifier units must supply energy to all of the rectifiers except the first. When current is drawn by a varying load, the rectifiers pass appreciable currents. Consequently, when two or more rectifiers are supplied from the one energy-storage element, the value of its energy undergoes a much greater drop during the conduction cycle than in the circuit of the present invention, where each rectifier is supplied from its own individual energy-storage element. This greater drop on the first energy-storage element, in series arrangement, is carried in cumulative fashion through each unit of the rectifier system, resulting in a greater loss of output voltage than in the parallel arrangement of the present invention, where the output voltage loss is merely additive.

It will be obvious that any number of rectifier units, such as illustrated in Fig. 1, may be used in cascade. For example, Fig. 2 shows a voltage tripling circuit which includes, in addition to the components comprising the circuit of Fig. 1, a further rectifier tube $V_3$, two further condensers $C_4$ and $C_5$, and resistor $R_2$. The additional elements $V_3$, $C_4$ and $C_5$ are connected in series relation across the input terminals of the rectifier system.

During the intervals between pulses, some of the charge $2E$ on condenser $C_3$ will leak off through resistor $R_2$ to charge condenser $C_4$ to this same voltage $2E$. Thus, during pulse periods, tube $V_3$ has applied to it the peak pulse voltage $E$ in addition to the D.-C. charge $2E$ on condenser $C_4$, and, consequently, the output condenser $C_5$ receives a total charge equal to $3E$.

Under certain conditions, each of the resistors $R_1$ and $R_2$ of Figs. 1 and 2 may be replaced by a choke coil. The desirability of such a replacement is governed in part by the recurrence frequency of the pulses P, by their shape, and by the output load.

Fig. 3 illustrates a circuit for securing a voltage output of negative polarity from a series of positive input pulses. These positive input pulses, having a peak amplitude $E$, are applied across the series combination of a condenser (or other energy-storage element) $C_1$ and a rectifier tube (or other unilateral conducting device) $V_1$. The D.-C. potential thus developed on condenser $C_1$ will have a value equal to $E$, the lower plate (in the drawing) of the condenser $C_1$ being of negative polarity.

During the intervals between pulses, condenser $C_2$ will be charged from condenser $C_1$ through resistor $R_1$. The magnitude of the charge established on condenser $C_2$ will also be equal to $E$.

Tube $V_2$ and condensers $C_2$ and $C_3$ are connected in series relation across the input terminals of the rectifier system. Consequently, during the pulse periods, condenser $C_3$ will acquire a charge $2E$ equal to the sum of the peak pulse voltage $E$ and the D.-C. voltage $E$ on condenser $C_2$. This charge $2E$ on condenser $C_3$ leaks off (when tube $V_2$ is non-conductive) through resistor $R_3$ and causes a similar charge $2E$ to be established on the output condenser $C_6$. It will be noted that the polarity of the charge $2E$ on condenser $C_6$ in Fig. 3 is opposite to the polarity of the charge $2E$ on condenser $C_3$ in Fig. 1.

Where the source of input pulses P is isolated, such, for example, as the secondary winding of a transformer, the circuit of Fig. 3 may be backed up to the circuit of Fig. 1 to give voltage quadrupling. That is, the input terminals of the two circuits may be connected in parallel, and the output terminals in series. The total output voltage would then be $2E+2E$, or $4E$. Of course, the total output voltage in such a consolidation of the circuits of Figs. 1 and 3 is dependent upon the number of rectifier units employed in each of the circuits. A large number of possible combinations of units to yield various output voltages will be readily apparent.

Having thus described my invention, I claim:

1. A rectifier system adapted to receive a series of voltage pulses across the input terminals thereof, said system including a first series combination of an electron discharge tube and an energy-storage device connected across the said input terminals, one terminal of said energy-storage device being connected to the anode of said electron discharge tube, a second series combination including an electron discharge tube and two energy-storage devices also connected across the said input terminals, the said electron discharge tube of the second series combination being connected intermediate the said two energy-storage devices thereof, said first and second series combinations effectively being in parallel relation, an impedance element, and means for connecting the anode of the electron discharge tube of said first series combination through said impedance element to the cathode of the electron discharge tube of said second series combination.

2. A system for producing a substantially smooth voltage output from an input consisting of recurrent voltage pulses, said system including a plurality of rectifying elements arranged in series and unidirectionally connecting the input and output terminals of said system, conductive impedance elements respectively interposed between successive rectifying elements, and a plurality of elements having a high impedance to the flow of direct current respectively connecting one terminal of each rectifying element to one of said input terminals, and the other terminal of each rectifying element to the other of said input terminals, except in the case of one rectifying element which has one of its terminals connected directly to one of said input terminals.

3. A voltage-multiplying rectifying s y s t e m adapted to receive recurrent voltage pulses, said system including a common input and output terminal and a unidirectionally conducting path from the other input terminal to the other output terminal, said unidirectionally conductive path including a plurality of resistors, and a plurality of diode rectifiers interspaced by said resistors, and further including a plurality of condensers respectively connecting the cathode of each diode rectifier to the said common input and output terminal and the anode of each diode rectifier to the other input terminal, except in the case of one diode rectifier which has its anode directly connected to the said other input terminal.

WINFIELD R. KOCH.

REFERENCES CITED

The following references are of record in the file of this patent:

UNITED STATES PATENTS

| Number | Name | Date |
|---|---|---|
| 1,992,908 | Cockcroft et al. | Feb. 26, 1935 |